Feb. 13, 1940.  W. J. KLEINKNECHT  2,190,478
TUBE COUPLING AND METHOD AND APPARATUS FOR MAKING SAME
Filed May 12, 1938
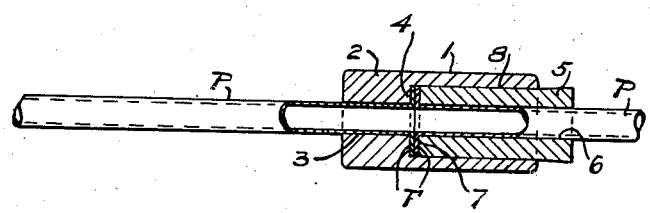
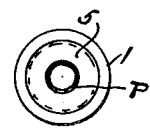
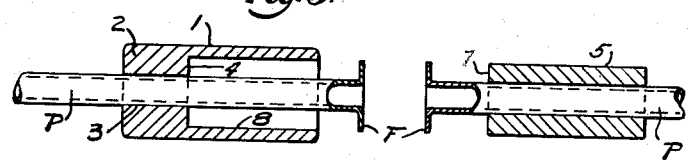
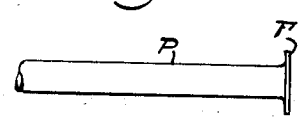
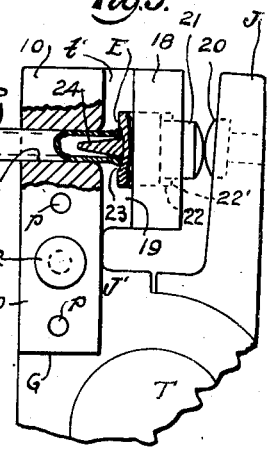
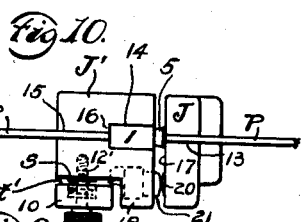
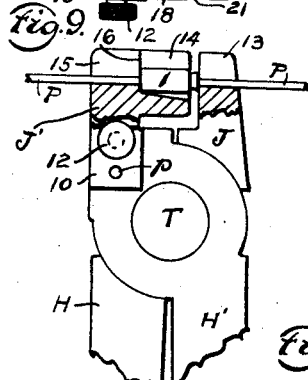
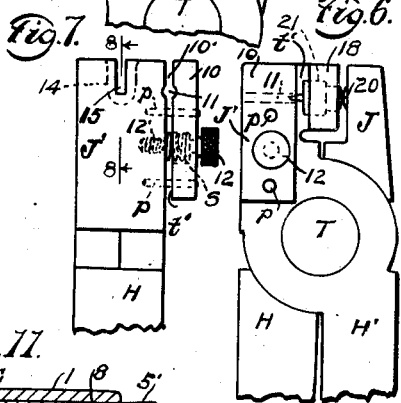
INVENTOR:
William J. Kleinknecht,
BY
Harold D. Penney  ATTORNEY.

Patented Feb. 13, 1940

2,190,478

UNITED STATES PATENT OFFICE 2,190,478

TUBE COUPLING AND METHOD AND APPARATUS FOR MAKING SAME

William J. Kleinknecht, Garden City, N. Y., assignor to American District Telegraph Company, Inc., Jersey City, N. J., a corporation of New Jersey Application May 12, 1938, Serial No. 207,462

6 Claims. (Cl. 29—88.2)

The present invention relates to an improvement in solderless couplings for metal tubing, and has for its object an improvement in the method and apparatus for making the coupling, and also an improvement in the associate means for assembling the coupling as well as for preparing the tube ends to which the coupling is attached.

The present coupling is of the compression fitted type and is threadless, as well as solderless, and when assembled, is strong, and leakproof to a high degree.

The foregoing, and other features of advantage will be apprehended as the herein description proceeds, and it will be obvious that modifications may be made in the construction herein disclosed, without departing from the spirit hereof, or the scope of the appended claims.

In the drawing,

Fig. 1 is a longitudinal sectional view of an assembled coupling, the tubes being partly in section;

Fig. 2 is an end view of Fig. 1;

Fig. 3 is a longitudinal sectional view of the component parts of the coupling, separated, before assembly;

Fig. 4 is a side view of a flanged tube end;

Fig. 5 enlarged, and partially fragmented, shows a tube end, partially sectioned, located in the manual tube end flanging tool, and about to be flanged;

Fig. 6 shows, in fragmentary reduced scale, the tube flanging side of the tool;

Fig. 7 is a view of Fig. 6 as viewed from the left hand side;

Fig. 8 is a fragmentary side view of the tool, partially sectioned taken on the line 8—8, Fig. 7, looking in the direction of the arrows, with the coupling compression jaws open with the couplings separated;

Fig. 9 is a view of the tool, similar in section to Fig. 8, but with the jaws closed and the coupling assembled;

Fig. 10 is a plan view of Fig. 9; and

Fig. 11 is a partially sectioned view of a modified form of coupling, it being converted into a tube end closure.

The compression coupling is shown in Figs. 1 to 4, inclusive, and comprises two tubes or pipes P, the ends to be coupled together being flanged as at F, Figs. 1, 3 and 4. This flanging is accomplished by a manually operated hand tool which may be carried to the place of installation, by the mechanic, the tool being later described, in detail.

In Fig. 3 is shown the flanged tube P—P, each flanged end mounting a coacting coupling member, these members being mounted on said tube ends before the flanging thereof. The outer coupling or ferrule 1, seen at the left hand of Fig. 3, is preferably of metal and has a bore 3 to slidably receive the tube P therein. Ferrule 1 also has a larger bore 8, to compressively receive a plug 5, which has a bore 6 therein to slidably receive the other coacting flanged tube P, Fig. 3.

With the tubes and coupling members 1 and 5 assembled as shown in Fig. 3, the flanged ends F are brought into contact with one another, in the bore 3 of the ferrule or coupling 1, the flanges being then seated against the seat or shoulder 4 in the ferrule 1. Then the compression plug 5 is forced into bore 4, the fitting of the plug in bore 4, being such that it forms a tightly assembled engagement in ferrule 1, and clamps the flanges F—F of the pipe ends firmly together between the face of bore shoulder 4 and the end 7 of the plug 5. Due to the tightness of the fit between the coupling members 1 and 5, the flanges are forced into a leak-proof contact and the coupling members themselves are tightly assembled to one another, also in a leak-proof manner, this being illustrated in Fig. 1.

This form of coupling also aligns the joined tubes perfectly and axially centers the bores of the tubes with each other, without interior distortion or protuberances.

The coupling members may be made up, separately, in automatic screw machines for the purposes herein described.

To accomplish the fitting and assembly of the tubes, a tool, preferably manually operated, is provided, said tool being preferably in the form of a modified pliers, comprising two elongate handle sections H and H', Figs. 6 and 9 which in plier-like constructions are pivoted together, by a pivot T, the opposite ends of said handles being formed into opposed, coacting combination tool jaw members J and J'. The handles H and H', shown abbreviated herein due to their length, enables the mechanic to exert considerable power on the relatively shorter, operative jaw ends.

The operative combination tool is shown in Figs. 5 to 10, inclusive, and it comprises, in addition to the parts already described, the construction of the jaws J and J' whereby they coact to perform two separate, sequential operations, first to flange the tube ends as shown in Fig. 4, and second, to compressively assemble the coupling structure.

To this end, the jaw member J is provided with a transverse slot 13, Figs. 8, 9 and 10, which slot in width is adapted to receive and seat a tube P therein, Fig. 10. The flat face 17 of the jaw J also fixedly mounts a round nose pin, the nose of which projects slightly beyond face 17.

The opposing jaw J', is provided with a compound slot 14—15, the forward slot 14, adjacent the jaw J being of a dimension to freely receive and seat the coupling ferrule 1, therein, Figs. 8, 9 and 10, the other slot 16, being adapted, like slot 13, to freely receive and seat a tube P therein, Fig. 10. A shouldered ledge 16 is thus formed by the contiguous slots 14—15 and this shoulder or ledge acts as a compression abutment, which, when the coupling is being assembled holds the coupling ferrule 1 in thrust resisting position. In use the two tubes P—P, assembled with their coupling members are placed in the aligned slots 13 and 15, as shown in Fig. 8, and the jaws J and J' are brought together by pressure on the handles H and H', until the plug 5 is firmly seated in the ferrule 1, as disclosed in Fig. 8, and the desired assembly of the coupling is thus attained.

The cooperating means for flanging the tube ends, including the round nose pin 20 on jaw J, are located at one side of jaw J' which is provided with a side recess f', leaving an adjacent outstanding ledge 18, Figs. 6 and 10, which is counterbored at 22 Figs. 5, 6 and 10, and in which counterbore is slidably mounted, for reciprocation therein, a tube flanging plug 21. The plug 21 has a rounded end which contacts with the rounded end of fixed plug 20 in jaw J, Figs. 5 and 6, the rounded end contacts described being provided to compensate for the arc-like movement of the jaws J and J', on their pivotal center T.

The movable flanging plug 21, on its inner face 23, Fig. 5, is provided with a pointed, cone-like extension, or pin 24, which, during the flanging operation, enters the end of tube P as shown in Fig. 5. The root of the cone like pin 24 is curved and merges into an outwardly curved, annular recess 23 in the plug face E. When the flanging plug is forced against the tube end, the curved root and annulus cause the end to expand outwardly and at the end of the operation to become flattened.

The side recess f' has mounted therein a loosely mounted, adjustable tube vise jaw 10, Figs. 5, 6, 7 and 10 which is bored to loosely and slidably fit on two pins p—p which are fixedly mounted in spaced apart positions in the side wall of recess f', as shown in Fig. 7. The vise jaw is counterbored at a point midway between pins p—p, shown dotted at S, Fig. 7, and a short coiled spring S is seated in the counterbore. This spring tends to keep the vise jaw 10 spaced away from its coacting vise face 10', Fig. 7, and to follow outwardly, a vise closing, knurl headed screw 12, the threaded end 12' of which is mounted for adjustment in jaw J, Figs. 7 and 10, when said screw is unscrewed to open the vise jaw 10. As disclosed in Fig. 7, the vise jaw and its coacting vise face 10' are provided with registering grooves 11, in which the tube to be flanged is firmly held during the end flanging operation of the tube.

In flanging a tube, the associate coupling member is first placed on the tube P, and the end to be flanged is placed between the open vise members in the grooves 11, and the end of the tube is pressed against the face E of the flanging plug E, thus entering the cone pointed pin into the bore of pipe or tube P, Fig. 5, and the plug 21 is then forced back by the tube until the plug 21 is seated against the bottom of the ledge 22' of the counterbore. This final action acts as a gauge for limiting the length of the tube end which is to be flanged. Then the vise screw 12 is tightened firmly to prevent back slippage of the tube and the handles H and H' are squeezed together, forcing the plug 21 inwardly and thus form the flange. Thereafter the vise screw is loosened, and the tube is lifted from between the vise faces and is then ready for the coupling operation previously described.

In Fig. 11 there is disclosed a coupled assembly, which is slightly modified over the assembly shown in Fig. 1, in that that modified device is used to close or cap one end of a tube. In Fig. 11 like indices are used to indicate similar parts of Fig. 1. The flanged tube P is entered into the bore 8 of ferrule 1, and, instead of using a bored plug 5, a solid plug 5' is forced into the bore 8, and the flange F is firmly clamped against the shoulder 4. This construction makes a leak-proof closure.

Having thus described the invention what is claimed is:

1. A coupling for holding together the end flanges of tubes, said coupling comprising a ferrule and a smooth cylindrical plug having alined small tube-receiving bores and adjacent opposed annular pressure faces adapted to receive said flanges when the tubes are in the small bores; said ferrule having a smooth cylindrical bore, less small than the alined bores, adjacent to its pressure face for receiving the plug with a forced fit, the fit being sufficiently forced and tight, and the area of contact between the smooth sides of the bore and the plug therein being sufficiently extended to provide sufficient friction, to maintain the flanges together with sufficient pressure to maintain their contact fluid-tight.

2. A coupling for holding together the end flanges of flanged tubes, said coupling comprising a ferrule and a smooth cylindrical plug having alined small bores receiving said tubes and adjacent opposed annular pressure faces adapted to receive said flanges when the tubes are in the small bores; said ferrule having a large smooth cylindrical bore, less long than the plug, adjacent to its pressure face for receiving the plug with a forced fit, whereby the plug may be forced longitudinally into the large bore without relative rotation and the flanges forced together without relative rotation of the flanges, the fit being sufficiently forced and tight, and the area of contact between the sides of the bore and plug being sufficiently extended to provide sufficient friction to alone maintain the flanges together with sufficient pressure to maintain their contact fluid-tight.

3. In combination, alined tubes having adjacent end flanges of an exterior diameter nearly twice that of the tube; and a coupling comprising a ferrule and a smooth cylindrical plug having alined small tube-receiving bores and adjacent opposed annular pressure faces perpendicular to the bores and adapted to receive said flanges when the tubes are in the small bores; said ferrule having a large smooth cylindrical bore adjacent to its pressure face, less long than the plug, snugly receiving the flanges and receiving the plug with a forced fit, whereby the plug may be quickly forced with one quick tool-movement longitudinally into the large bore without relative rotation and the flanges forced together without relative rotation of the flanges; the length of said large bore being about twice its diameter, and the fit being sufficiently forced and tight, and the area of contact between the smooth sides of the bore and plug being sufficiently great relative to the area of the flanges to provide sufficient friction, to alone hold the flanges together with sufficient pressure to maintain their contact fluid-tight when the plug is projected and the ends and sides of the ferrule and plug are exposed and unengaged; said bore being laterally closed at said flanges and to engaging the flanges to keep the flanges from spreading under pressure and for assisting in maintaining the flanges fluid-tight; the exterior end and side faces of said tube and ferrule being free of projecting structure.

4. A method of assembling a coupling for ends of flanged tubes, the coupling comprising a ferrule and a smooth cylindrical plug therein having alined small bores and adjacent opposed annular pressure faces to receive said flanges when the tubes are in the small bores; said ferrule having a large smooth cylindrical bore less long than the plug for receiving the plug with a forced fit, the fit being sufficiently tight and forced, and the area of contact between the sides of the bore and plug being sufficiently extended, to provide sufficient friction to alone maintain the flanges together fluid-tight, said method comprising simultaneously engaging and holding opposite sides of the ferrule and opposite sides of the two tubes respectively beyond the ferrule and plug for guiding, and holding the ferrule and tubes in adjacent and alined position and against tendency, to relative rotation around their axes; and pressing upon the exposed ends only of the ferrule and plug respectively while the plug is projected without tendency to any relative rotation of said plug and ferrule around the axis of the coupling for quickly forcing said plug and ferrule toward each other, without tendency to relative rotation between the ferrule and plug and with sufficient force to overcome the tight fit and to force the plug inwardly of the large bore with a quick straight line relative movement and cause said pressure faces to quickly force the flanges together fluid-tight while the flanges are maintained free of relative rotation between each other, the ferrule and the plug, thereby to avoid injury to the flanges and to cause the flanges to cohere and coalesce in an air-tight manner; and then removing the engagement from the sides of the tubes and ferrules and the pressure from the ends of the plug and ferrule, to allow the friction of the forced fit to alone maintain the pressure to maintain the flanges fluid tight.

5. Apparatus for assembling a coupling for ends of flanged tubes, the coupling comprising a ferrule and a smooth cylindrical plug therein having small alined bores and adjacent opposed annular pressure faces to receive said flanges when the tubes are in the small bores; said ferrule having a large smooth cylindrical bore less long than the plug for receiving the plug with a forced fit, the fit being sufficiently tight and forced, and the area of contact between the bore and plug being sufficient, to provide sufficient friction to alone maintain the flanges together fluid-tight; said apparatus comprising members having means for simultaneously and laterally engaging opposite sides of both tubes respectively beyond the ferrule and plug for guiding and alining the tubes in alined position; one member having means for engaging and holding opposite sides of the ferrule when the tubes are thus engaged and alined; said members respectively having means for pressing upon the exposed ends only of the ferrule and plug while the plug is projected; means for constraining the members to move quickly toward each other without any relative rotation of said members or any of said means around the axis of the coupling, for quickly forcing said plug and ferrule toward each other, without tendency to relative rotation with sufficient force to overcome the tight fit and to force the plug inwardly of the large bore with a quick straight line relative movement and cause said pressure faces to force the flanges together fluid-tight while the flanges are maintained free of relative rotation between each other, the ferrule and said plug, thereby to avoid injury to the flanges and to cause the flanges to cohere in an air-tight manner; said means being removable from the sides of the tubes and ferrule and the ends of the ferrule and plug while the latter are holding the flanges fluid-tight.

6. Apparatus for assembling the coupling of claim 3, said apparatus comprising handled relatively pivoted members, said pivoted members having means for laterally engaging opposite sides of the tubes respectively beyond the ferrule and plug and guiding and alining the tubes in adjacent and alined position; one member having means for engaging and holding opposite sides of the ferrule when the tubes are thus alined; said members respectively having means for pressing upon the exposed ends only of the ferrule and plug respectively at opposite ends of the coupling, whereby the members may be pivotally moved without any rotation of said members or any of said means around the axis of the coupling for quickly, without rotation, forcing said plug and ferrule toward each other, without tendency to relative rotation between the ferrule and plug and with sufficient force to force the plug inwardly of the large bore with a quick straight line relative movement and cause said pressure faces to quickly force the flanges together fluid-tight while the flanges are maintained free of relative rotation between each other, the ferrule and the plug, thereby to avoid injury to the flanges and to cause the flanges to cohere and coalesce in an air-tight manner.

WILLIAM J. KLEINKNECHT.